United States Patent Office 3,208,526
Patented Sept. 28, 1965

3,208,526
REMOVAL OF SUSPENDED SOLIDS FROM AQUEOUS SOLUTIONS CONTAINING HETEROPOLYSACCHARIDES PRODUCED BY BACTERIA OF THE GENUS XANTHOMONAS
John T. Patton and Willis E. Holman, Tulsa, Okla., assignors, by mesne assignments, to Esso Production Research Company, a corporation of Delaware
No Drawing. Filed Apr. 11, 1963, Ser. No. 272,215
19 Claims. (Cl. 166—38)

The present invention relates to the removal of suspended solids from aqueous solutions and is particularly concerned with an improved process for removing solid particles from solutions containing heteropolysaccharides produced by bacteria of the genus Xanthomonas.

A variety of polymers, gums and other high molecular weight materials have been investigated for use as additives to drilling muds and other fluids employed in the petroleum industry. Among the most effective materials looked at in recent years are the heteropolysaccharides derived from carbohydrates by the action of bacteria of the genus Xanthomonas. Experience has shown that these particular heteropolysaccharides are surprisingly effective for improving the flow characteristics and other properties of aqueous drilling muds and that they can generally be employed in concentrations significantly lower than those required with starch, dextran and similar materials. Certain problems have been encountered in using the heteropolysaccharides, however, due to difficulties in separating suspended solids from the heteropolysaccharide solutions. It has been found that cuttings, sand grains and other particles entrained in muds containing the heteropolysaccharides are not effectively removed by the mechanical separation devices normally used for desanding purposes on drilling rigs and similar equipment and that these particles therefore tend to accumulate in the muds as drilling progresses. This makes the mud highly abrasive, increases the mud weight, and adversely affects other mud properties. Similar problems are encountered in other applications of the heteropolysaccharides. In order to minimize these problems, muds and other fluids containing the heteropolysaccharides generally have to be reformulated at frequent intervals.

In accordance with the present invention, it has now been found that difficulties encountered in the past in removing cuttings, sand grains and other solids from drilling muds and other fluids containing the heteropolysaccharides can largely be avoided by the addition of water-soluble compounds which in solution yield divalent cations. Experimental work has shown that the presence of such cations reduces the ability of the heteropolysaccharide solutions to suspend solid particles without adversely affecting their other characteristics. By providing the divalent cations in the proper concentrations, cuttings, sand grains and similar solids can readily be removed from muds and other fluids containing the heteropolysaccharides with conventional mechanical separation equipment. This facilitates use of the heteropolysaccharides in optimum concentrations for drilling muds and similar fluids and largely eliminates difficulties of the type referred to above.

The heteropolysaccharides which are employed in accordance with the invention are high molecular weight polymers produced by the action of bacteria of the genus Xanthomonas upon carbohydrates. Representative species of these bacteria which may be utilized to produce these polymers include *Xanthomonas begoniae*, *Xanthomonas campestris*, *Xanthomonas carotae*, *Xanthomonas hederae*, *Xanthomonas incanae*, *Xanthomonas malvacearum*, *Xanthomonas papavericola*, *Xanthomonas phaseoli*, *Xanthomonas pisi*, and *Xanthomonas translucens*. Laboratory work has indicated that production of the heteropolysaccharides is a characteristic trait of all members of the genus Xanthomonas but that certain species of these bacteria produce the polymers with particular efficiency and are therefore more attractive for synthesizing the heteropolysaccharides than are others. *Xanthomonas begoniae*, *Xanthomonas campestris*, *Xanthomonas incanae* and *Xanthomonas pisi* are particularly outstanding in this respect.

The Xanthomonads act upon a wide variety of carbohydrates to produce the heteropolysaccharide utilized for purposes of the invention. Suitable carbohydrates include glucose, sucrose, fructose, maltose, lactose, galactose, soluble starch, cornstarch and the like. Fermentation studies have shown that the carbohydrates employed need not be used in a refined state and that crude materials containing carbohydrates in substantial quantities are generally satisfactory for preparing the polymers. Specific examples of such crude materials include raw sugar, crude molasses, sugar beet juice, raw potato starch and the like. The crude materials are generally much less expensive than the corresponding refined carbohydrates and are therefore normally preferred for use as substrates.

The heteropolysaccharides are normally produced from carbohydrates such as those described above by employing an aqueous fermentation medium containing from about 1 to about 5 weight percent of the carbohydrate selected. Organic nitrogen sources and inorganic salts are generally added to the medium. From about 0.1 to about 0.5 weight percent of dipotassium acid phosphate and from about 0.1 to about 10 weight percent of a nutrient, distiller's solubles for example, may be used to supply the nitrogen and salts needed. The use of these latter materials is not necessary in all instances, however. The trace elements and organic nitrogen are frequently present in certain of the crude carbohydrate source materials in sufficient concentrations to permit bacterial fermentation and hence no additional nutrients are required. Excellent results may be obtained, for example, by fermenting an aqueous solution of raw sugar beet juice.

The production of the heteropolysaccharide may be carried out with conventional fermentation equipment. Fermentation takes place under aerobic conditions. Temperatures between about 70° F. and about 100° F. are normally used. The pH is generally maintained between about 6.0 and about 7.5 during fermentation in order to increase the heteropolysaccharide yield. The polymer is normally recovered at the end of about 48 hours as a crude fermentate having a viscosity of several thousand centipoises. This material may be centrifuged or filtered to remove the bacterial cells. The essentially pure polymer can be recovered by precipitating it with methanol, ethanol, acetone, a quaternary ammonium compound or a similar reagent. The product is generally dried to produce a soft bulky powder which swells rapidly in the presence of small quantities of water and is readily soluble when added to water in relatively low concentrations.

Drilling muds, completion fluids, workover fluids, fracturing fluids, acidizing solutions and other compositions utilized in accordance with the invention generally contain heteropolysaccharides of the type described above in concentrations between about 0.001 percent and about 3.0 percent by weight. Higher heteropolysaccharide concentrations generally produce excessively high viscosities; while fluids containing the materials in concentrations below about 0.001 percent normally lack the fluid loss control properties and other characteristics necessary in such fluids. The use of concentrations between about 0.05 percent and about 0.5 percent by weight is preferred.

Conventional mud mixing equipment may be utilized for addition of the dried heteropolysaccharides to water or brine in preparing the fluids of the invention. The dried powder granules generally do not hydrate readily at acid or neutral pH values. It is therefore frequently advantageous to add a small amount of sodium hydroxide, potassium hydroxide or similar alkaline reagent to the water or brine to raise the pH of the solution to a value above about 7.5. In moderately alkaline solutions, the powder granules rapidly hydrate and become voluminous. Full viscosity generally develops within a period of about 15 or 20 minutes, depending upon the temperature conditions and the particular heteropolysaccharide employed. If an acidizing solution containing the heteropolysaccharide is to be prepared, concentrated hydrochloric acid or the like may be added to the water or brine in concentrations sufficient to obtain the desired pH value after the heteropolysaccharide has hydrated.

The compounds employed in conjunction with the heteropolysaccharides are water-soluble compounds which in aqueous solution yield divalent cations. Water-soluble salts are normally employed. Suitable salts include barium acetate, barium chloride, cadmium chloride, calcium acetate, calcium chloride, calcium nitrate, calcium perchlorate, ferric chloride, ferric nitrate, lead chlorate, lead nitrate, magnesium chloride, magnesium nitrate, magnesium sulfate, manganese chloride, lead sulfonate, nickel chloride, zinc chloride, zinc sulfate, and the like. Because of their low cost and ready availability, calcium chloride, magnesium chloride and zinc chloride are generally preferred for purposes of the invention.

In order to promote the recovery of cuttings and similar particles with conventional equipment, salts of the type described above are generally added to the fluids in concentrations of from about 0.05 percent by weight up to concentrations sufficient to saturate the fluids. Concentrations in the range between about 0.1 percent and 35 percent by weight, where solubility permits, are generally preferred. The salts are normally added to the fluid after hydration of the heteropolysaccharide but in some cases may be added before the polymer hydrates.

The drilling muds and other fluids employed for purposes of the invention may contain, in addition to the heteropolysaccharide and the water-soluble salts described above, other agents designed to modify the properties of the fluids. Materials which may be present include weighting agents such as barium sulfate, amorphous silica and calcium carbonate; gel-forming materials such as bentonite and Attapulgus clay; viscosity modifying agents such as sodium metaphosphate and quebracho; emulsifiers such as petroleum sulfonate, tall oil soaps and sodium lignosulfonate; and mixing oils such as crude oil and diesel oil. It will be understood that not all of these constituents will normally be present in any one drilling mud or other composition and that the amount of any particular material present will generally be governed to a large extent by the other constituents in the composition and the service for which the composition is intended.

The effect of the addition of compounds which yield divalent cations upon aqueous solutions containing the heteropolysaccharides can readily be seen by considering the results obtained in laboratory and field tests of drilling muds and other compositions containing heteropolysaccharides produced by *Xanthomonas campestris*.

EXAMPLE I

In the first of a series of experiments, an aqueous solution containing a heteropolysaccharide produced by the action of Xanthomonas organisms upon a carbohydrate was prepared. The polymer was utilized in a concentration of 1.5 pounds per barrel of water. Barium sulfate marketed commercially for use as a drilling fluid weighting agent was added to this solution in a concentration of 66 pounds per barrel. Bacterial degradation was avoided by the inclusion of paraformaldehyde in a concentration of 0.66 pound per barrel. The resulting solution was then divided into 16 samples. Salts yielding divalent cations in aqueous solution were added to 10 of these samples in concentrations ranging from 1 pound per barrel to 120 pounds per barrel. Six samples which either contained no salts or included only salts yielding monovalent cations were used for control purposes. The samples were then uniformly agitated to assure suspension of all of the solids present and were allowed to stand for 48 hours in graduated cylinders. The volume of solids which had settled from each sample at the end of the 48 hour period was measured. The results obtained are set forth in the following table.

*Effect of divalent cations upon settling rate*

| Sample No. | Polymer, #/bbl. | BaSO$_4$, #/bbl. | (CH$_2$O)$_3$, #/bbl. | NaCl, #/bbl. | CaCl$_2$, #/bbl. | ZnCl$_2$, #/bbl. | Ca(NO$_3$)$_2$, #/bbl. | MgSO$_4$, #/bbl. | NaOH, #/bbl. | Solids Settled in 48 hrs., cc. |
|---|---|---|---|---|---|---|---|---|---|---|
| 1 | 1.5 | 66 | 0.66 | | | | | | | 0 |
| 2 | 1.5 | 66 | 0.66 | 1 | | | | | | 0 |
| 3 | 1.5 | 66 | 0.66 | | 1 | | | | | 7.5 |
| 4 | 1.5 | 66 | 0.66 | | | 1 | | | | 15 |
| 5 | 1.5 | 66 | 0.66 | 5 | | | | | | 0 |
| 6 | 1.5 | 66 | 0.66 | | 5 | | | | | 15 |
| 7 | 1.5 | 66 | 0.66 | | | 5 | | | | 15 |
| 8 | 1.5 | 66 | 0.66 | 120 | | | | | | 0 |
| 9 | 1.5 | 66 | 0.66 | | 120 | | | | | 30 |
| 10 | 1.5 | 66 | 0.66 | | | 120 | | | | 60 |
| 11 | 1.5 | 66 | 0.66 | 9.6 | | | | | | 0 |
| 12 | 1.5 | 66 | 0.66 | 9.6 | 5 | | | | | 5 |
| 13 | 1.5 | 66 | 0.66 | 9.6 | | 5 | | | | 10 |
| 14 | 1.5 | 66 | 0.66 | 9.6 | | | | 5 | | 10 |
| 15 | 1.5 | 66 | 0.66 | | | | | 5 | | 5 |
| 16 | 1.5 | 66 | 0.66 | | | | | | 1 | 0 |

It can be seen from the table that the addition of salts yielding divalent cations significantly increased the quantity of solids which settled from the samples. The accelerated settling rates are apparently due to an interaction between the heteropolysaccharide and polyvalent cations and are not the result of reactions involving the barium sulfate. It will also be noted that the amount of solids which settled out in response to the presence of a particular salt increased with increasing salt concentration and that all of the salts were not equally effective. Zinc chloride tended to produce more rapid settling of the barite than did calcium chloride. By adding these salts or similar compounds to aqueous solutions of the heteropolysaccharide to increase the settling rate of suspended solids, the efficiency of settling basins, screening devices, centrifuges and other mechanical separation equipment employed for the removal of such solids from the heteropolysaccharide solutions can thus be improved significantly.

EXAMPLE II

In a second test, a drilling mud was prepared by adding a heteropolysaccharide produced by the action of *Xanthomonas campestris* on glucose to fresh water in a concentration of 1 lb./barrel. This is equivalent to about 0.29 percent by weight. After the polymer had hydrated, barium sulfate was added as a weighting agent in a concentration of 70 lbs./barrel, about 20 percent by weight. The resulting mud had a pH of about 6.5, a weight of about 10 lbs./barrel, and a viscosity of about 9 centipoises. Calcium chloride was then added to a portion of this mud in a concentration of 1 lb./barrel. The addition of the salt had no apparent effect upon the viscosity or other properties of the mud. A sample of the mud containing the salt and a sample of salt-free mud were then allowed to stand overnight. After 14 hours the amount of barium sulfate which had settled in each sample was measured. It was found that 86 percent of the barite had settled from the sample containing the calcium chloride; whereas only 32 percent of the weighting agent had settled out of the salt-free sample. This difference in settling rates further demonstrates the effect of divalent cations upon the ability of the heteropolysaccharide solution to maintain solid particles in suspension. Similar results were obtained by adding 1 lb. calcium chloride per barrel to a salt water mud containing 120 lbs. of sodium chloride per barrel.

EXAMPLE III

A clear water solution containing 1 lb./barrel of a heteropolysaccharide produced by the fermentation of glucose with *Xanthomonas campestris* was employed as a drilling mud in a full scale drilling operation. Despite the use of conventional rig desanding equipment to remove cuttings, sand grains and other solids from the mud at the surface, the solids content of the mud gradually increased to 9 percent by volume. This was accompanied by a corresponding increase in the abrasive characteristics of the mud and by changes in other mud properties. Calcium chloride was then added to the mud in a concentration of 80 lbs./barrel, about 23 percent by weight. The operation of the desander immediately became more efficient. Measurements when the operation was terminated a short time later showed that the solids content of the mud had decreased to 7.6 percent by volume.

EXAMPLE IV

The effect of divalent cations on the mechanical separation of solids from solutions containing the heteropolysaccharide is also shown by the results of filtration tests. An impure heteropolysaccharide produced by drying a crude fermantate containing bacterial cells, unconverted carbohydrate and other foreign matter was added to tap water in a concentration of 0.29 percent by weight. A sample of the resulting solution was then filtered under a differential pressure of 100 pounds per square inch in order to remove the insoluble matter. A period of thirty minutes was required to filter 325 milliliters of the solution.

Following the initial test described above, a second sample of the original solution was modified by the addition of calcium chloride in a concentration of 0.35 pounds per barrel. This modified solution was then filtered, using a filter of the same porosity as that employed initially and a differential pressure of 100 pounds per square inch. It was found that the time required for filtration of 325 milliliters of solution was reduced by the presence of the calcium ions from the initial value of 30 minutes to about three minutes. Further tests with other samples of the initial solution modified by the addition of calcium chloride in concentrations of 10 pounds per barrel and 20 pounds per barrel showed reductions in filtration time to values of 35 and 58 seconds under the same conditions The above results demonstrate that a fifty-fold reduction in the time required to filter suspended solids from solutions of the heteropolysaccharide can be obtained by the addition of divalent cations. This will permit significant savings in processes where solutions of the heteropolysaccharide must be filtered, centrifuged, passed through settling basins or otherwise treated for the mechanical removal of suspended solids.

What is claimed is:

1. A process for the removal of suspended solids from an aqueous solution of a heteropolysaccharide derived from a carbohydrate by bacteria of the genus Xanthomonas which comprises adding a water-soluble compound yielding divalent cations to said solution in a concentration sufficient to accelerate the mechanical separation of suspended solids from the solution without precipitating said heteropolysaccharide and thereafter mechanically separating said solids from said solution.

2. A process as defined by claim 1 wherein said water-soluble compound is a calcium salt.

3. A process as defined by claim 1 wherein said water-soluble compound is a zinc salt.

4. A process for the removal of solid particles from a wellbore which comprises circulating in said wellbore an aqueous solution of a heteropolysaccharide derived from a carbohydrate by the action of bacteria of the genus Xanthomonas to which a water-soluble salt yielding divalent cations has been added in a concentration sufficient to accelerate the mechanical separation of suspended solids from the solution and thereafter mechanically separating entrained solids from said solution.

5. A process as defined by claim 4 wherein said entrained solids are separated from said solution by settling.

6. A process as defined by claim 4 wherein said salt is calcium chloride.

7. A process as defined by claim 4 wherein said salt is zinc chloride.

8. A process as defined by claim 4 wherein said salt is present in a concentration between about 0.1 percent and about 35 percent by weight.

9. A process as defined by claim 4 wherein said heteropolysaccharide is derived from a sugar by the action of *Xanthomonas campestris*.

10. A process for the movement and recovery of solid particles which comprises entraining said particles in an aqueous solution containing from about 0.001 percent by weight to about 3.0 percent by weight of a heteropolysaccharide produced by the action of bacteria of the genus Xanthomonas on a carbohydrate and in excess of about 0.05 percent by weight of a water-soluble salt yielding divalent cations capable of accelerating the mechanical separation of suspended solids from said solution without precipitating said heteropolysaccharide, and thereafter mechanically separating said particles from the solution.

11. A process as defined by claim 10 wherein said aqueous solution contains sodium chloride in addition to said heteropolysaccharide and said salt yielding divalent cations.

12. A process as defined by claim 10 wherein said salt yielding divalent cations is present in a concentration within the range between about 0.1 percent and about 35 percent by weight.

13. A process as defined by claim 10 wherein said particles are separated from said solution by centrifugation.

14. A process as defined by claim 10 wherein said particles are separated from said solution by filtration.

15. A process for the removal of suspended solids from an aqueous solution of a heteropolysaccharide derived from a carbohydrate by bacteria of the genus Xanthomonas which comprises adding to said aqueous solution in excess of about 0.05 percent by weight of a treating agent consisting essentially of a water-soluble salt yielding divalent cations capable of accelerating the mechanical separation of suspended solids from the solution without precipitating said heteropolysaccharide and thereafter filtering said suspended solids from said solution.

16. A process as defined by claim 15 wherein said salt is calcium chloride.

17. A process as defined by claim 15 wherein said salt is zinc chloride.

18. A process for the removal of insoluble particles from a viscous solution produced by the action of *Xanthomonas compestris* on a carbohydrate which comprises adding a treating agent consisting essentially of a water-soluble calcium compound to said solution in a concentration in excess of about 0.05 percent by weight and thereafter mechanically separating said particles from the solution without precipitating the heteropolysaccharide contained therein.

19. A process as defined by claim 18 wherein said calcium compound is added in a concentration of from about 0.1 percent to about 35 percent by weight.

References Cited by the Examiner

UNITED STATES PATENTS

| | | | |
|---|---|---|---|
| 3,000,790 | 9/61 | Jeanes et al. | 195—31 |
| 3,020,206 | 2/62 | Patton et al. | 195—31 |
| 3,020,207 | 2/62 | Patton | 195—31 |
| 3,054,689 | 9/62 | Jeanes et al. | 106—208 |
| 3,096,293 | 7/63 | Jeanes et al. | 252—316 |

BENJAMIN HERSH, *Primary Examiner.*

A. LOUIS MONACELL, *Examiner.*